United States Patent [19]
Elorza

[11] Patent Number: 6,067,896
[45] Date of Patent: May 30, 2000

[54] PRESSURE COOKER WITH A CLOSURE LOCKING SYSTEM FOR THE LID

[75] Inventor: Joseba Barrena Elorza, Mondragon, Spain

[73] Assignee: Fagor, S. Coop., Mondragon, Spain

[21] Appl. No.: 09/432,139

[22] Filed: Nov. 2, 1999

[30] Foreign Application Priority Data

Nov. 13, 1998 [ES] Spain .................................. 9802378

[51] Int. Cl.⁷ ............................ A47J 27/08; A47J 27/09; A47J 27/092; B65D 45/00; B65D 45/34
[52] U.S. Cl. .............................. 99/337; 99/403; 220/203; 220/293; 220/316; 220/325; 220/912
[58] Field of Search .............................. 99/330, 340, 337, 99/338, 342, 403, 407, 449; 220/203, 208, 293, 316, 325, 326, 912, 324, 314; 126/377, 378, 373, 374, 388, 389, 369; 292/256

[56] References Cited

U.S. PATENT DOCUMENTS

| | | |
|---|---|---|
| 2,549,387 | 4/1951 | Richeson .................................. 220/316 |
| 4,024,982 | 5/1977 | Schultz ..................................... 220/293 |
| 4,135,640 | 1/1979 | MacQuilkin et al. .................. 220/316 |
| 4,161,260 | 7/1979 | Lagostina ................................ 220/319 |
| 4,162,741 | 7/1979 | Walker et al. .......................... 220/203 |
| 4,574,988 | 3/1986 | Karliner ................................. 220/316 |
| 4,711,366 | 12/1987 | Chen ......................................... 99/337 |
| 4,733,795 | 3/1988 | Boehm .................................... 220/316 |
| 4,796,776 | 1/1989 | Dalquist et al. ........................ 220/203 |
| 4,932,550 | 6/1990 | Moucha .................................... 99/403 |
| 5,048,400 | 9/1991 | Ueda et al. ............................... 99/403 |
| 5,370,257 | 12/1994 | Chameroy et al. ................. 220/293 X |
| 5,678,721 | 10/1997 | Cartigny et al. ..................... 99/337 X |

*Primary Examiner*—Timothy Simone
*Attorney, Agent, or Firm*—The Kline Law Firm

[57] ABSTRACT

The pressure cooker with a system (3) for locking the closure of the lid (2) on the pan comprises an elastic locking collar housed in the recess (2b) in the lid, clamping the rim (1a) of the pan, a release trigger (5) and a transmission mechanism (7) from the trigger (5) to the collar (4), which has a dividing gap (4a), while its section is flat and angled. The transmission mechanism (7) is housed inside the handle (6) of the lid and it has a member (15), jointed to the trigger (5) and connected to the ends of the collar (4), for the expansion of said collar via a rack (15a).

4 Claims, 2 Drawing Sheets

PRESSURE COOKER WITH A CLOSURE LOCKING SYSTEM FOR THE LID

The present invention relates to a pressure cooker and specifically to a system for the closing and locking of the lid against the pan by means of an expanding collar, housed in the lid, which encircles the pan.

PRIOR ART

DE-19703765 discloses a pressure cooker with a pan which has an outward bent rim and a hollow lid with inward bent U-profiled lateral edge housing a closure locking collar, which clamps below the pan rim, thereby preventing the lid from lifting. The collar has a hollow U-shaped section and its loop is divided into two semicircular halves, each of which swivels inwards or outwards to close or open the cooker, respectively. The ends of the collar on both sides of the two divisions have a pin to make the collar halves swivel.

DE-19544717 discloses a pressure cooker with a locking collar housed under the edge of the lid. The locking collar has a sectioned wall which is angled in relation to the vertical wall of the pan, connecting the bent edge of the pan and the edge of the lid. The angled wall stops the lid from being raised. To release the closure, the segments making up the collar pivot round an axis of their own to reduce their angle of inclination.

ES-2082420 (EP-543750) shows a lid locking device with a locking member that engages the rim of the pan. The release mechanism is actuated by pressing a pivoting button with which an arm is articulated. This compresses a return spring and transmits the movement by way of a stem to the locking member.

EP-691096 shows a mechanism for locking and releasing the lid on a pressure cooker, which comprises two diametrically opposed locking members jointed to an intermediate shift mechanism fitted with a return spring, which is actuated by means of a pushbutton. The expansion mechanism cannot be actuated to release the closure, when the valve that detects the presence of residual steam pressure is lifted and is projecting from the lid.

DISCLOSURE OF THE INVENTION

The object of the present invention is a pressure cooker with a pan closure locking system by means of an expanding locking collar in the lid of the cooker which clamps the rim of the pan, thereby preventing the cooker from being opened as long as residual steam pressure is detected, as defined in the claims.

The lid is placed on the pan closing the cooker by means of exerting a light pressure on the lid, engaging the locking collar with the pan rim with hardly any resistance. The releasing operation is carried out conveniently, while gripping a radial handle seated on the lid for lifting it, by exerting a very light pressure with one finger only on a release trigger, which expands the locking ring to remove the lid. The release trigger is concealed under the handle. A transmission mechanism from the trigger to the locking collar is housed in the body of the handle, which is superimposed on the lid of the cooker.

The cooker also has two valves on the lid, one for pressure regulation and the other for detecting the residual pressure, the latter connected to a residual pressure indicator, which, while lifted, impedes the action of the release trigger. The transmission mechanism from the trigger to the collar steps up the force exerted on the trigger, and it is made with parts of simple configuration that free the passage of the two valves and, in addition, admit clearances in the connections between them and with the elastic collar.

PREFERRED EMBODIMENT OF THE INVENTION

Figure 1:
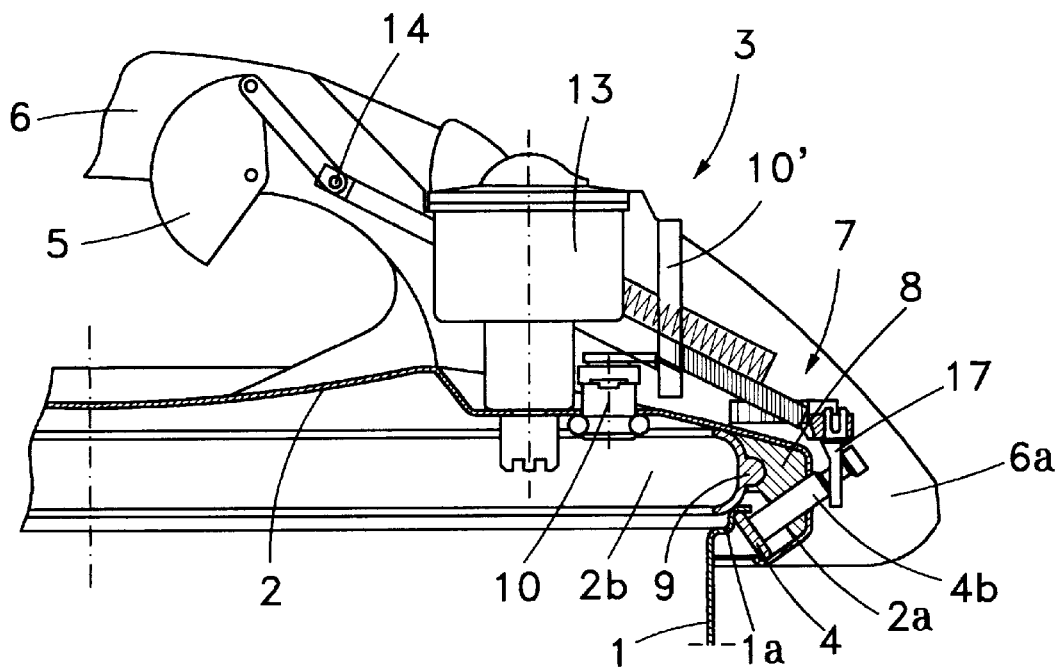
FIG. 1 is a sectional view of the lid closure locking system on the pressure cooker according to the invention, in its lid locked condition.
Figure 2:
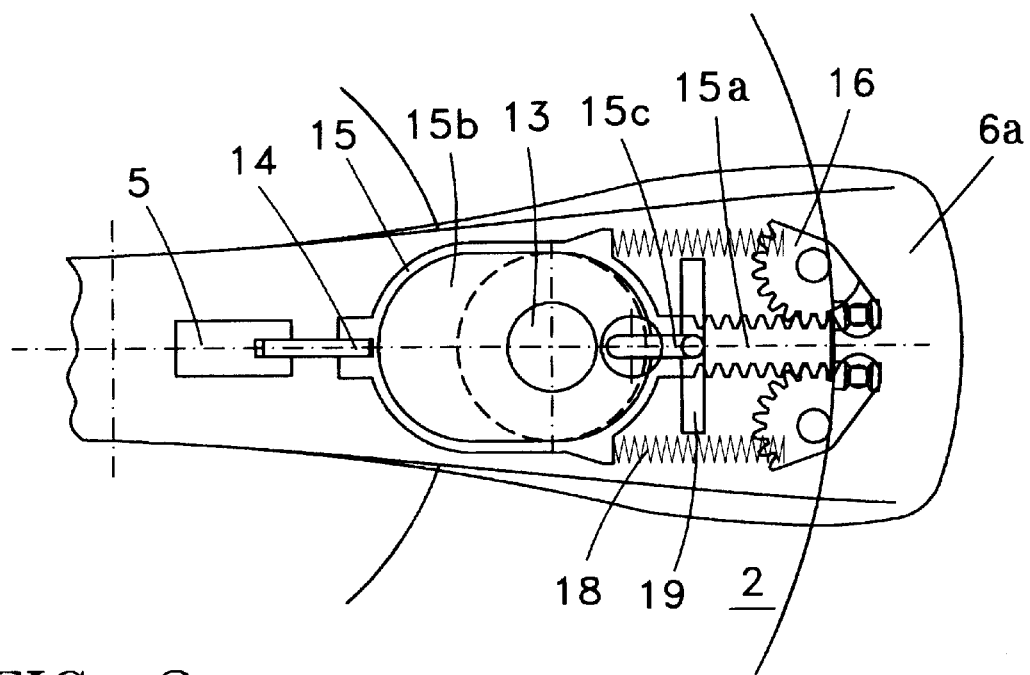
FIG. 2 is a plan view of the locking system in FIG. 1.
Figure 3:
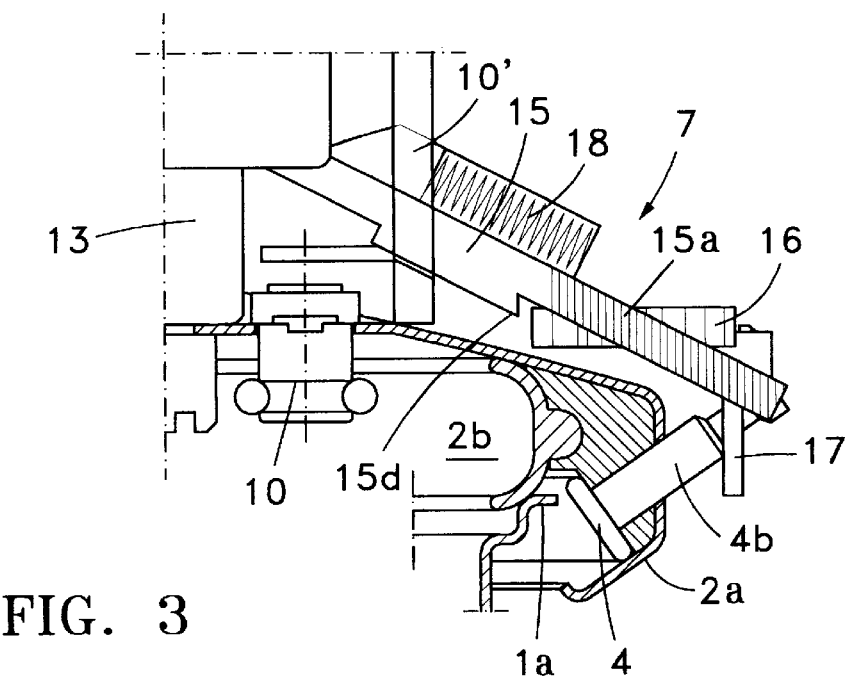
FIG. 3 is a close view of the locking system in FIG. 1, in its lid closure released condition.

With reference to FIGS. 1–3, the pressure cooker according to the invention comprises a cooker pan 1 which contains an outward bent rim, a lid 2 with an inward bent lateral edge 2a, which forms an interior recess 2b running round the pan rim, a radial handle 6 seated on the lid, a sealing ring seated on the pan rim 1a, and a lid closure locking system 3, which comprises an elastic locking collar 4 housed in the recess 2b in the lid, a release trigger 5 positioned under the radial handle 6 of the lid, a transmission mechanism 7 for opening the collar 4, a rigid ring piece for securing the collar 4 and for guiding its expansion inside the recess 2b in the lid, a residual steam pressure valve 10 which rises, projecting from the lid, and at the same time pushes a pressure indicator 10', and a steam pressure regulating valve 13, which protrudes from the lid 2.

Figure 5:
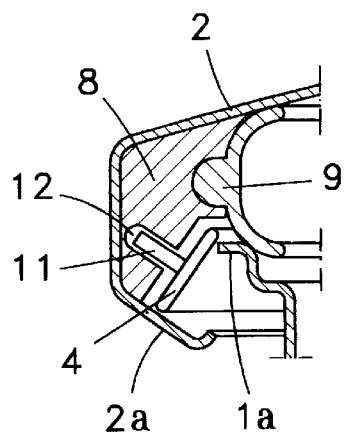
FIG. 5 shows a close view of the coupling of the expanding collar in FIG. 4 to the cooker lid.
Figure 4:
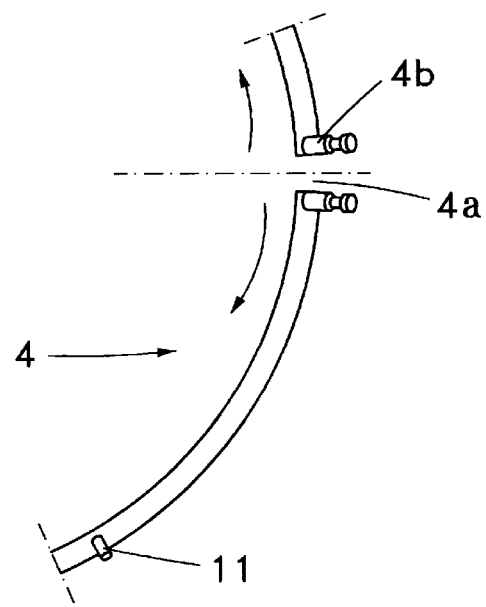
FIG. 4 shows partly the expanding collar of the locking system in FIG. 1.

With reference to FIG. 4, the locking collar 4 has a plain section wall, with an inward angle of inclination to mate the outside edge 2a of the lid with the whole outside edge of the outer rim 1a of the pan, a dividing gap 4a which allows for diametrical expansion, and two ends of the collar on either side of the division 4a each fitted with a traction pin 4b and various tangs 11 spaced around collar 4 which are housed in the collar guide ring piece 8. The ends of the locking collar 4b are separated for closure release by means of the traction that the locking mechanism 7 exerts on the pins 4b. The collar guide ring piece (FIG. 5) has various open channels 12 where they are seated and the tangs 11 are guided during the expansion and contraction of the locking collar 4.

The radial handle 6 (FIGS. 1 and 2) extends over the lid 2 in a radial direction, leaving a space for inserting your hand, and it is prolonged towards the outside edge in a wide handle body 6a until it projects from the lid 2. The hand trigger 5 that actuates the mechanism 7 for closure release by opening the locking collar 4 is visible under the radial handle 6. The transmission mechanism 7 is housed in the body of the handle 6a and it also extends radially from the trigger 5 to the outside edge of the lid 2.

Via a linkage 14 the action of the hand trigger 5 pushes towards the outside edge a sliding member, which is extended radially over the lid 2 and terminates in a rack 15a. The shifting member has a slide 15b to free the passage of the cylindrical valve 13 and a slide 15c to free the passage of the indicator 10'. The rack 15a meshes on either side with a sector of pinion 16 which, as it turns, draws the pin 4b of the elastic collar tangentially so as to expand it. In this way, as shown in FIG. 3, the expanded collar 4 disengages from the edge 1a of the pan and the lid 2 may be raised. The release operation cannot be carried out until the valve 10 and the pressure indicator 10' have dropped after the all the steam has been discharged. The sliding member 15 has a stop 15d underneath and the cylindrical indicator 10' has a flat base 19 that impedes the forward movement of the member 15 as long as the pressure indicator 10' is raised. After removal of the lid 2, the elasticity of the collar 4 returns the transmission mechanism 7 to its closure condition by way of a coil spring 18, which recovers its full length ready to be compressed again when, in the next cooker closure operation, the lid 2 is pressed against the pan 1 and the collar extending beyond the edge 1a of the pan connects with the rim 1a of the pan.

Figure 6:
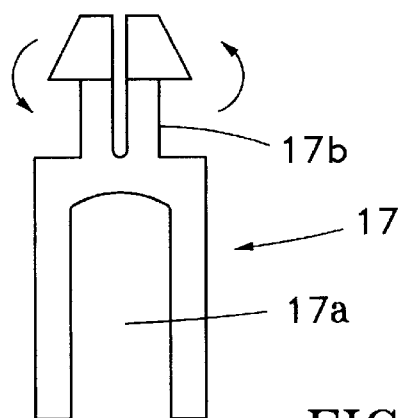
FIG. 6 shows a connection member of the locking mechanism in FIG. 1 to the expanding collar in FIG. 5.

The drive pinions 16 are linked to the locking collar pins (FIG. 6) by means of a connecting yoke 17, which has a neck (17b) for attachment to the pinion 16 and a forked opening 17a for engaging the pin 4b, with connection clearance with the collar 4 in allowance for dimensional deviations in the diameter of the collar 4 and the springs 18. This connecting yoke 17 may be made as one piece with the pinion 16 by means of plastic moulding.

I claim:

1. Pressure cooker with a cooker closure locking system (3), comprising a pan with an outside rim, and a lid (2) having a lateral U-profiled edge that forms an inner recess covering the outside rim of the pan, and provided with a sealing ring (9) housed in the hollow edge of the lid, and with a handle extending radially over the lid, a cooking pressure regulating valve housed in the radial handle, and a valve lifted by residual steam pressure for insertion in the locking system, a cooker closure locking system comprising an elastically expanding locking collar housed in the recess (2b) in the lid, a hand trigger (5) that actuates the closure release, and a transmission mechanism (7) from the hand trigger (5) to the locking collar (4), wherein the locking collar (4) has a dividing gap (4a) which allows for its elastic expansion, while its section is flat and angled in order to mate with the outside rim of the pan, and the transmission mechanism (7) is housed inside the handle (6), and it has a radially sliding member (15) jointed to the hand trigger (5), which frees the passage of the regulating valve (13) and of the pressure indicator (10'), and it converts its movement into traction on the ends (4b) of the collar for its diametrical expansion by means of a rack (15a).

2. The pressure cooker of claim 1, wherein the locking collar (4) is secured and guided in its expansion by a rigid ring piece (8) housed in the hollow edge of the lid.

3. The pressure cooker of claim 1, wherein the hand control (5) is a pivoting trigger (5) which is visible under the radial handle (6) of the cooker lid.

4. The pressure cooker of claim 1, wherein the sliding member (15) is attached to the collar (4) by means of a yoke (17) with connection clearance.

* * * * *